Aug. 18, 1953  W. A. WOJCIK ET AL  2,649,516
ALARM-INITIATING DEVICE FOR AUTOMOBILES
Filed May 11, 1950  2 Sheets-Sheet 2

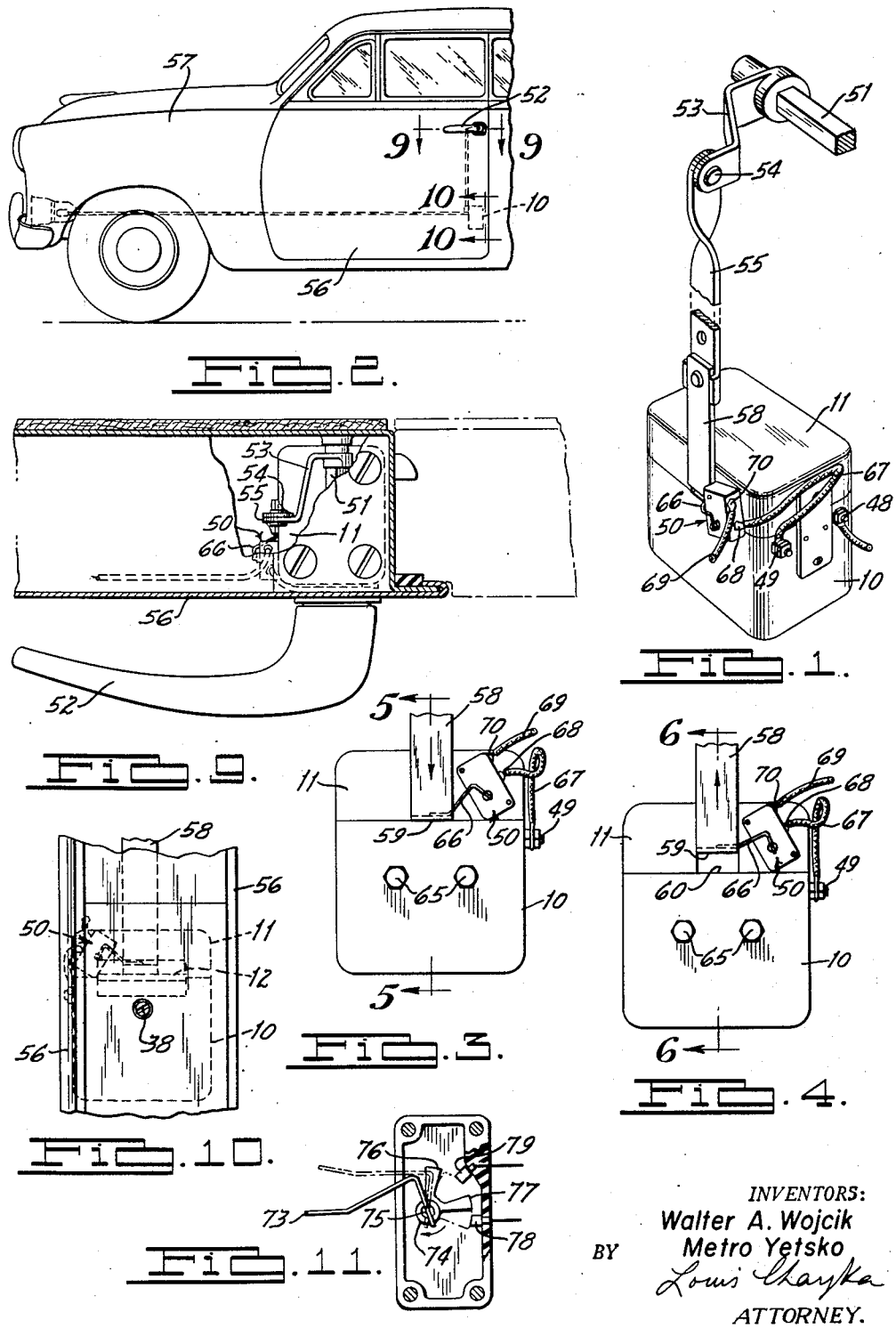

INVENTORS:
Walter A. Wojcik
Metro Yetsko
BY Louis Chayka
ATTORNEY.

Patented Aug. 18, 1953

2,649,516

UNITED STATES PATENT OFFICE 2,649,516

ALARM-INITIATING DEVICE FOR AUTOMOBILES

Walter A. Wojcik and Metro Yetsko, Detroit, Mich.

Application May 11, 1950, Serial No. 161,362

2 Claims. (Cl. 200—52)

Our invention pertains to a device which is adapted to be installed in an automobile and to be included in an electric circuit provided with a sensitive switch which becomes closed on any movement of the automobile while said automobile is out of use with the door thereof having been locked from outside.

The object of our improvement is to provide a device equally sensitive irrespective of any temporary angular position of the frame of the automobile with respect to its normal horizontal position. Such angular position of the frame may accur on some incline or because of some unevenness of ground on which the automobile may be located. A further object of our improvement is to couple the device to the lock in a door of the automobile in such a manner that the device, normally inoperative, will become operative only after the door has been closed and secured in such closed position by means of said lock. A further object of our improvement is to provide a more sensitive switch, which is a part of our device, the switch itself being novel and useful and adapted for use with other devices of the same type.

We shall now describe our improvement with reference to the accompanying drawings in which:

Fig. 1 is a perspective view of the outer casing of our device and of means whereby said device is coupled to the shaft of a door-lock of said automobile;

Fig. 2 is a side elevational view of the front part of the automobile, the view disclosing the location of our device within a door of said automobile and the position of the said device with relation to the door lock therein;

Fig. 3 is a front elevational view of the casing of our device with certain co-operative elements mounted thereon, the casing being shown as viewed from within the interior of the automobile when the door is closed;

Fig. 4 is the same elevational view of the casing with an element disclosed in a position different than that shown in Fig. 3;

Fig. 9 is a horizontal sectional view on line 9—9 of Fig. 2, the section being taken through the lock of the automobile in which the device is installed;

Fig. 10 is a sectional view on line 10—10 of Fig. 2;

Fig. 11 is a sectional view of an auxiliary switch box to disclose arrangement of contact points therein;

Similar numerals refer to similar parts throughout the several views.

Figure 5:
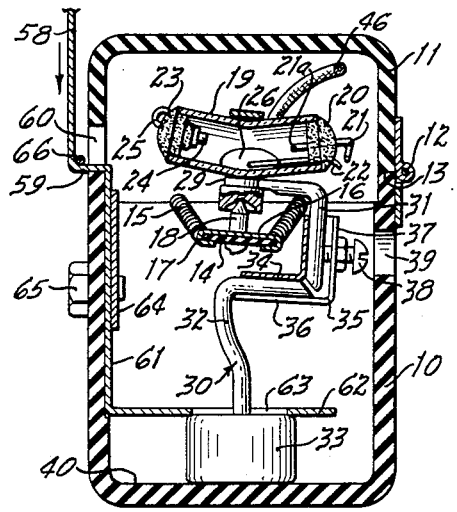
Fig. 5 is a vertical sectional view on line 5—5 of Fig. 3, the view disclosing a mercury switch within the casing and a mounting therefor.
Figure 6:
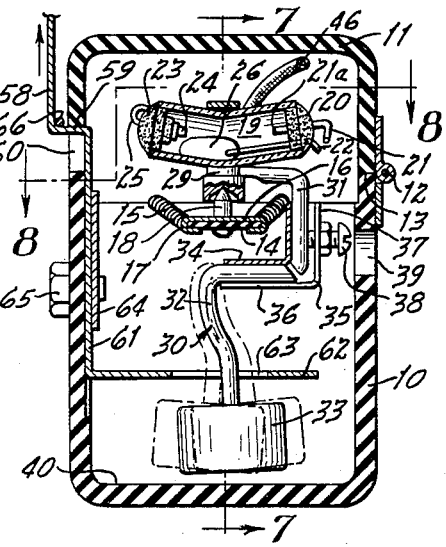
Fig. 6 is a vertical sectional view on line 6—6 of Fig. 4, the view disclosing parts of our device within the casing in different operative positions than those shown in Fig. 5.
Figure 7:
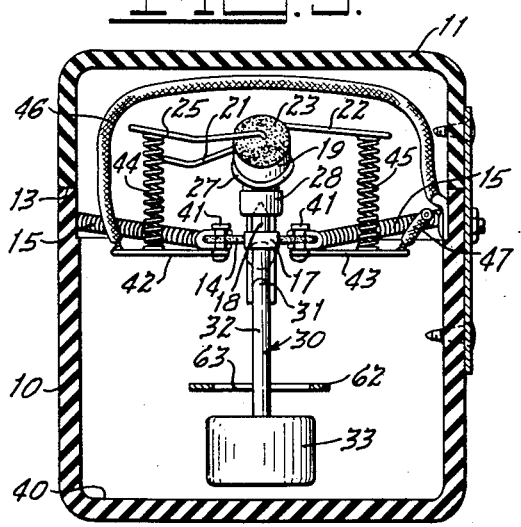
Fig. 7 is a vertical sectional view on line 7—7 of Fig. 6.
Figure 8:
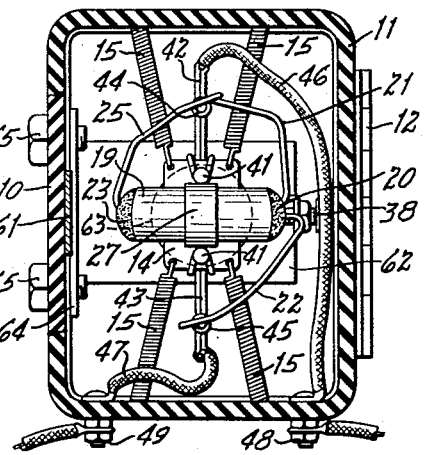
Fig. 8 is a horizontal sectional view on line 8—8 of Fig. 6.
Figure 12:
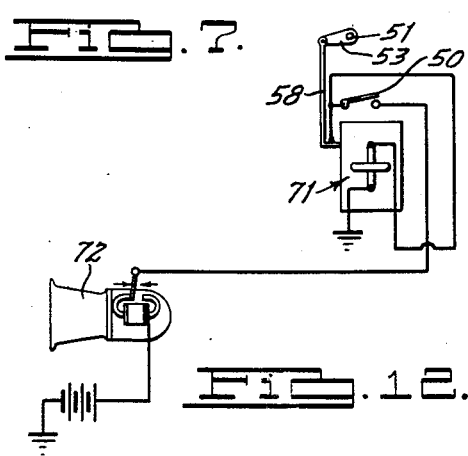
Fig. 12 is a diagram of an electric circuit controlled by our device and including a sound-horn of an automobile.

The essential part of our device, comprising a mercury switch, is contained in a casing 10 provided with a cover 11 hinged at 12 for ready access to the interior of said casing. Disposed therein below the level of the upper rim 13 of said casing is an oblong horizontal platform 14 made best of a dielectric sheet material, the platform being suspended at its corners by coiled springs 15, each of them being anchored to the wall of the casing 10. Mounted upon the platform and extending transversely thereto is a metal strip 16 bent at each end in a hairpin turn 17 for a frictional hold upon the edge and the undersurface of said platform. This is best shown in Figs. 5 and 6. Rising upwardly from said strip is a sharp pointed pin 18, the purpose of which will be described presently.

The switch itself comprises an arcuate tube 19 made of glass or some other dielectric material, the tube being disposed in such a manner that its mid-portion is lower than its upwardly curving end members. These are provided with closures or plugs made of an electrically non-conducting material. The plug 20 at one end of the tube is perforated axially for admission of a wire 21 projecting inwardly into the tube and forming therein a terminal 21a. Another wire 22 passes through the same plug inwardly in a spaced relation to said wire 21, said wire 22 extending along the bottom of the tube to approximately the mid-length of said tube, as best shown in Fig. 5. A plug 23 at the opposite end of the tube contains an axially-disposed terminal 24 projecting into the tube. Extending outwardly from said terminal is a lead-in wire 25.

A small quantity of liquid mercury 26 is contained within the tube and normally rests upon wire 22 but out of contact with terminals 21a and 24.

An annular bracket 27 embracing tube 19 is mounted on a cylindrical member 28 disposed vertically and provided within its bottom with an axially disposed socket 29. The socket is cone-shaped at the top for admission of pin 18 upon which said cylindrical member said tube 19 is supported. A portion of member 28 just below said tube is of a reduced diameter, this portion being ringed by a collar 29, said collar forming the upper end of a pendulum, generally indicated by numeral 30. The pendulum includes a crank-shaped stem composed of an upper member 31, having the shape of an inverted letter L, and a lower member 32 completing the crank formation of the stem and supporting a drum-shaped weight 33. The two portions of the stem are joined by a resilient L-shaped spring 34 permitting the two members of the stem to be flexed towards each other so that the angle of their junction, which is normally 90 degrees, may be decreased or increased as desired. This is effected by rigid L brace 35 including a horizontal arm 36 which is welded to the lower portion 32 of the stem and a vertical arm 37 running parallel to the vertical part of member 31, but in a spaced relation thereto. An adjusting screw 38 passing through said arm 37 of the brace and bearing against said vertical member 31 of the stem, serves as a means whereby said vertical member may be swung inwardly from said vertical arm 37, causing a shift in the position of the weight as the center of gravity of the pendulum is effected by said inward swing. As a result thereof, tube 19, with the liquid mercury therein, will be tilted in a direction opposite to the shift of the weight. To permit adjustment of screw 38, casing 19 is provided with a small opening 39. Different positions of the weight 33 as a result of the adjustment above described are shown in dotted lines in Fig. 6.

To conclude the description of the pendulum, it must be added that the weight 33 is provided with a flat top and a flat bottom, said bottom being normally in a parallel relation to bottom 40 of the casing, but in a spaced relation thereto.

Clamped to platform 14 by means of bolts 41 and in an opposed relation to each other are two horizontal arms 42 and 43, the arms being made of a stiff metal wire of good electric conductivity. Mounted on each arm is an upright coil made of thin flexible wire, said coils being marked 44 and 45, respectively. The coils act both as shock absorbers and as current-conducting members between the wires leading from the terminals of the mercury switch and insulated outlet wires 46 and 47 leading to binding posts 48 and 49 on the outer surface of the casing. Specifically, terminal 22, disposed at the bottom of tube 19, is connected to coil 45. Terminal 24, at the opposite end of the tube, is connected by means of wire 25 to the opposite coil 44. Additionally, terminal 21a is also connected, by means of wire 21, to the same coil 44. Thus, depending upon the position of the tube, to which reference will be made herebelow, electric current may be transmitted from wire 22 through the body of mercury to the terminal 24 at one end of the tube or to terminal 21a at the other end of the tube, the current passing through both upright coils 44 and 45 to wire arms 42 and 43 and through two insulated wires 46 and 47, respectively.

Mounted on the outer surface of cover 11 is an auxiliary switch, generally indicated by numeral 50, the switch being connected in series with the mercury switch and a sounding horn or the electric lighting system or both. In its simpler form the switch is connected only to the sounding horn, and, being operatively connected to the lock of the automobile, is controlled by said lock. Mechanical means for this purpose comprise the following structure: A shaft 51, actuated by a handle 52 and forming an element of a lock in the door 56 of an automobile 57, is provided with a radially extending arm 53. The latter is pivotally connected at 54 to a vertical bar 55 extending downwardly towards the aforementioned casing 10, the casing being located within said automobile door. At its lower end said bar 55 is adjustably connected to a slideable shank 58. Midway its length the shank forms a horizontal shoulder 59 passing into said casing 10 through a slot 60 in the wall thereof and continues downwardly along said wall, as shown at 61. At the lower end the shank terminates with a flat clamping plate 62. The plate is provided with a large circular opening 63 and is disposed so that stem 32 of pendulum 30 will pass through the center of said opening while the plate itself is adapted to be lowered, by means of said shank 58, over the top of weight 33 to clamp said weight against the bottom 40 of casing 10. A cross-plate 64 within the said casing is affixed to the wall thereof by screws 65 holding the lower part 61 of shank 58 in a parallel relation with the wall of the casing.

Connected to the shoulder 59 of said shank, as best shown in Fig. 5, is a lever 66 for the operation of the auxiliary switch 50. The connection is such that as the shank is moved upwardly by means of arm 53 on shaft 51 of the automobile lock when the car is being locked, the switch will be closed, permitting passage of electric current therethrough. The current is carried by means of an insulated wire 67 leading from binding post 49 on casing 10 to a terminal 68 of said auxiliary switch 50, the lead wire 69 being attached to another terminal 70 of said auxiliary switch.

The two alternate positions of lever 66 are shown in Figs. 3 and 4, respectively. Specifically, one position of the lever is shown in Fig. 3 where shank 58 is in its lowered position, clamping the pendulum down, while the auxiliary switch is open. Fig. 4 shows the shank and the lever in the upwardly-moved position when the pendulum is adapted to swing freely, while the auxiliary switch 50 is closed, permitting passage of current therethrough.

Figure 13:
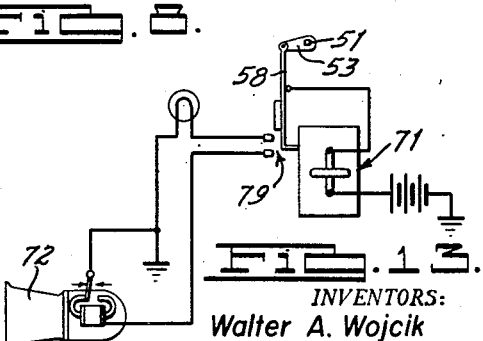
Fig. 13 is another diagram of an electric circuit adapted to include electric lights and a sound-horn in sequence.

The auxiliary switch 50 may be designed to control only the sounding horn, as shown in a diagram of the electric circuit in Fig. 13 where the mercury is indicated by numeral 71, the auxiliary switch is indicated by numeral 50, the shank controlling said auxiliary switch is marked 58, and the sounding horn is marked 72.

A preferred species of the auxiliary switch is shown in Fig. 11 wherein switch lever 73 to be operated by shank 58 is adapted to connect into the electric circuit, in succession, first a light or lights of the automobile and then the sounding horn. The construction of such a switch is not inventive, the form shown in Fig. 11 being only illustrative of this type of switch. It includes a rotary member 74 mounted on an arbor 75 which forms a part of the circuit, the rotary member including two radially-extending members 76 and 77, said members forming segments of a disk, each having an arcuate outer periphery. One of the segments is intended to engage a contact pin 78 which is wired to lights; the other member 76 is to engage a contact pin 79 wired to the sounding horn. The space between the segments along their outer periphery exceeds the space between said contact pins so that during the rotation of member 74 in the direction shown by an arrow in Fig. 11 contact between segment 77 and contact pin 78 will be established first.

A diagram of the circuit, including the lights and the sounding horn with the auxiliary switch adapted to include said lights and the sounding horn in sequence, is shown in Fig. 13. The auxiliary switch, including leads to the lights and to the horn, is marked by numeral 79. The mercury switch is marked 71, while the shank operating the auxiliary switch 79 is marked 58.

We shall now describe the operation of our device. It will be assumed that the door of the automobile in which our device is installed has been properly unlocked. In the process of unlocking it, shaft 51 of the lock, actuated by handle 52, will depress shank 58 by means of arm 53, causing the plate 62 to clamp down the weight 33 of pendulum 30 against the bottom 40 of casing 10. This will be effected against the tension of spring coils 15 which, by intermediate means already described, support said pendulum. The downward movement of the shank will throw open, by means of lever 66, the auxiliary switch 50, cutting off connection with the mercury switch, specifically, with the arcuate tube 19, rendering said mercury switch inoperative.

When, on leaving the automobile, the door is to be locked, shaft 51 will, in the course of locking the door, pull up said shank 55 by means of the radial arm 53. This will release weight 33 from its clamped position against the bottom of casing 10. Simultaneously, lever 66 will throw in the auxiliary switch 50, in order to permit passage of electric current through the arcuate tube 19 to said auxiliary switch and therefrom to the lights and the sounding horn.

It will be noted that the arcuate tube is mounted upon the top of the pendulum and that any slight jar to the car will agitate the mercury conductor therein, throwing it with the movement of the pendulum into contact with one or the other of the terminal points projecting into the tube through the plugs in the ends of said tube. As even the process of locking the door is ordinarily sufficient to impart a swinging movement to the pendulum, it will be advisable to turn the shaft 51 slowly, causing lever 66 first to switch on the lights. As a result of the oscillating, back and forth movement of the mercury within the tube, the lights will deliver a series of flashes. When the flashes have ceased the locking may be completed by continuing the turning of the shaft 51 till the sounding horn will also be switched on by said auxiliary switch. With the door fully locked and the auxiliary switch thrown in as a result thereof, no lights will be shown and the horn will remain silent as long as the automobile is not jarred or moved. Any disturbance, however, of the body of the automobile will immediately impart a swinging motion to the pendulum, cause an oscillating movement of mercury within its tube, and produce intermittent flashes of light and intermittent blasts from the sounding horn till the movement of the pendulum has ceased.

It will be understood that some changes may be made in the structure of our device without departing from the inventive principle disclosed herein.

What we, therefore, wish to claim is as follows:

1. An electric mercury switch including a casing, a horizontal platform therein, coil springs supporting said platform, a pendulum including a crank-shaped stem and a weight at the lower end thereof, the stem being suspended from said platform, an arcuate tube mounted on the stem above the level of its suspension from the platform, the mid-portion of the tube being at a lower level than its end portions, electric terminals projecting through the end portions of the tube into the interior thereof, and a quantity of mercury within the tube normally in contact with one terminal.

2. An electric mercury switch including a casing, a horizontal platform therein, coil springs supporting said platform, a pendulum including a crank-shaped stem and a weight at the lower end thereof, the stem being suspended from said platform, an arcuate tube mounted on the stem above the level of its suspension from the platform, the mid-portion of the tube being at a lower level than its end portions, electric terminals projecting through the end portions of the tube into the interior thereof, a quantity of mercury within the tube normally in contact with one terminal, and a clamping plate to anchor the pendulum against its swinging movement, the clamping plate being adapted to be operated by manual means.

WALTER A. WOJCIK.
METRO YETSKO.

References Cited in the file of this patent

UNITED STATES PATENTS

| Number | Name | Date |
|---|---|---|
| 1,298,055 | Kershaw | Mar. 25, 1919 |
| 1,305,352 | Gettell | June 3, 1919 |
| 1,566,501 | O'Brien | Dec. 22, 1925 |
| 1,728,230 | Murray | July 9, 1929 |
| 1,844,338 | Rupert | Feb. 9, 1932 |
| 2,035,895 | Kelly | Mar. 31, 1936 |
| 2,069,970 | Richter | Feb. 9, 1937 |
| 2,176,770 | Maught | Oct. 17, 1939 |
| 2,214,556 | Jewell | Sept. 10, 1940 |

FOREIGN PATENTS

| Number | Country | Date |
|---|---|---|
| 643,079 | France | Sept. 18, 1927 |